United States Patent [19]

Huber

[11] Patent Number: 4,556,133

[45] Date of Patent: Dec. 3, 1985

[54] FRICTION CLUTCH

[75] Inventor: Lothar Huber, Bühl, Fed. Rep. of Germany

[73] Assignee: Luk Lamellen und Kupplungsbau GmbH, Bühl, Fed. Rep. of Germany

[21] Appl. No.: 593,624

[22] Filed: Mar. 26, 1984

[30] Foreign Application Priority Data

Mar. 25, 1983 [DE] Fed. Rep. of Germany ....... 3310972
May 26, 1983 [DE] Fed. Rep. of Germany ... 8308978[U]
May 26, 1983 [DE] Fed. Rep. of Germany ....... 3347912

[51] Int. Cl.$^4$ ............................................. F16D 13/58
[52] U.S. Cl. ............................. 192/70.16; 192/70.27; 192/70.28; 192/89 B
[58] Field of Search ............... 192/70.16, 70.27, 70.28, 192/89 B, 113 A

[56] References Cited

U.S. PATENT DOCUMENTS

| 3,424,288 | 1/1969 | Sink | 192/70.16 |
| 3,712,435 | 1/1973 | Kraus | 192/70.27 |
| 4,195,719 | 4/1980 | Martinez | 192/70.27 X |
| 4,333,554 | 6/1982 | Sink et al. | 192/70.27 X |
| 4,410,074 | 10/1983 | Maucher et al. | 192/70.27 X |
| 4,450,945 | 5/1984 | Caray | 192/70.27 X |

FOREIGN PATENT DOCUMENTS 1775997  3/1966  Fed. Rep. of Germany ... 192/70.27

Primary Examiner—Edward G. Favors
Attorney, Agent, or Firm—Peter K. Kontler

[57] ABSTRACT

A friction clutch wherein the pressure plate at one side of the clutch disc is axially movably connected with a cover by a set of leaf springs. The cover is driven by the crankshaft of the engine. The pressure plate is biased against the adjacent lining of the clutch disc by a diaphragm spring whose radially outermost portion reacts against the cover and which bears against the pressure plate in a region which is located somewhat inwardly of the radially outermost portion. The clutch disc is disposed between the axially movable pressure plate and a counterpressure plate which is non-rotatably affixed to the support by a distancing component made of sheet metal and holding the counterpressure plate at a fixed distance from the support. The distancing component has a clamping portion overlying that side of the counterpressure plate which faces away from the support.

40 Claims, 9 Drawing Figures

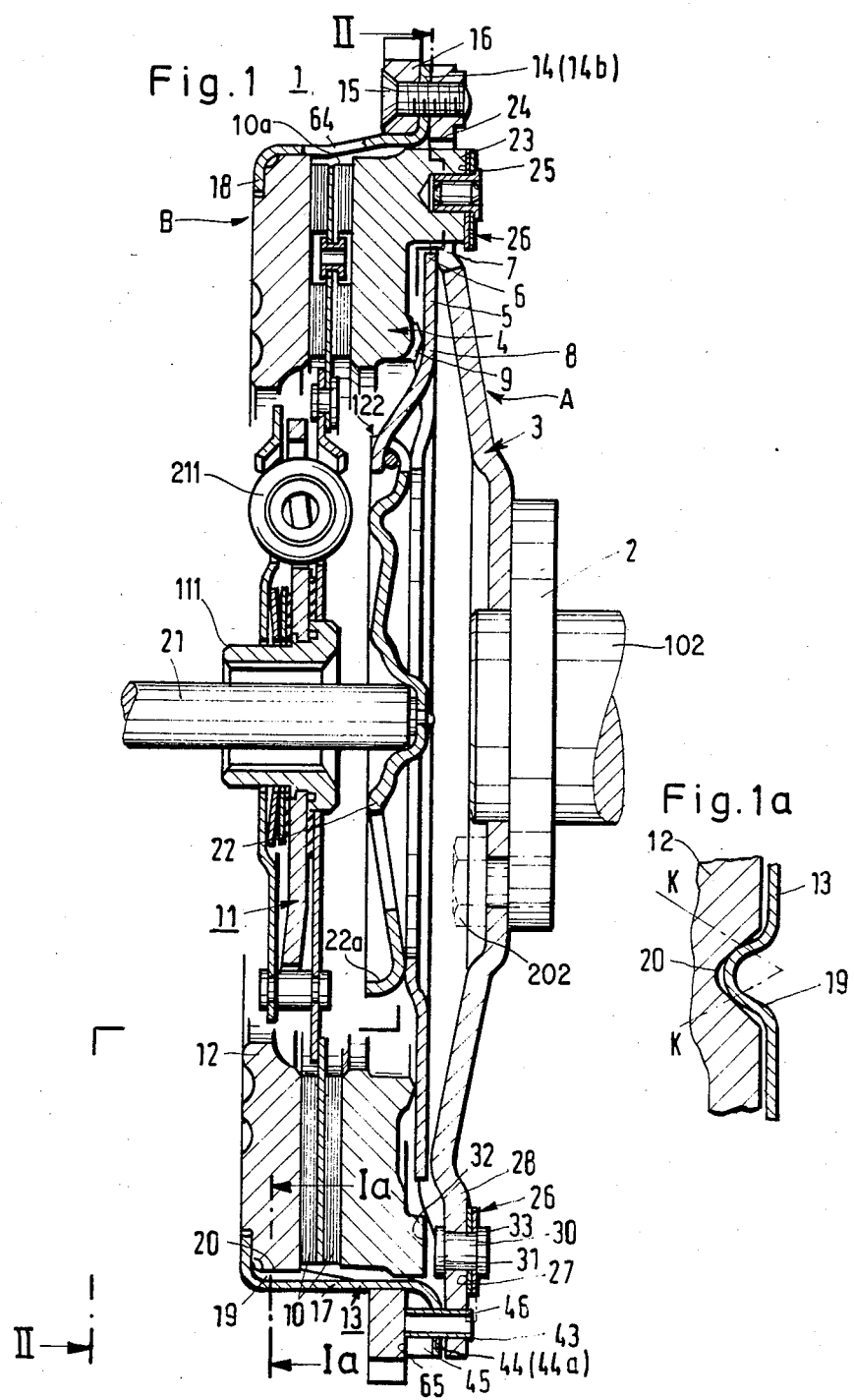

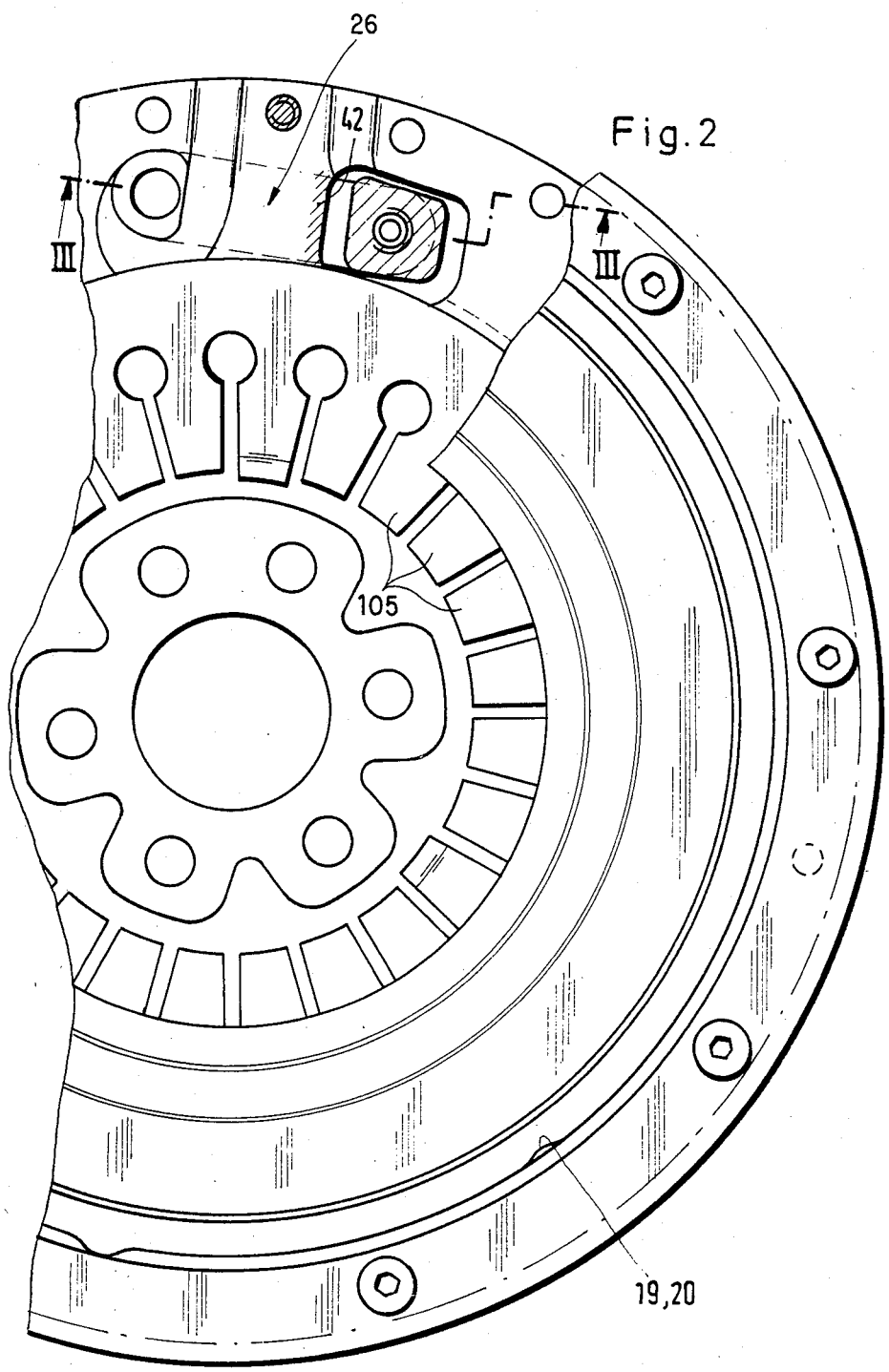

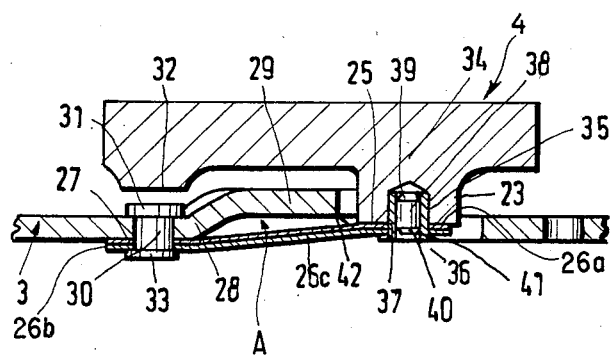

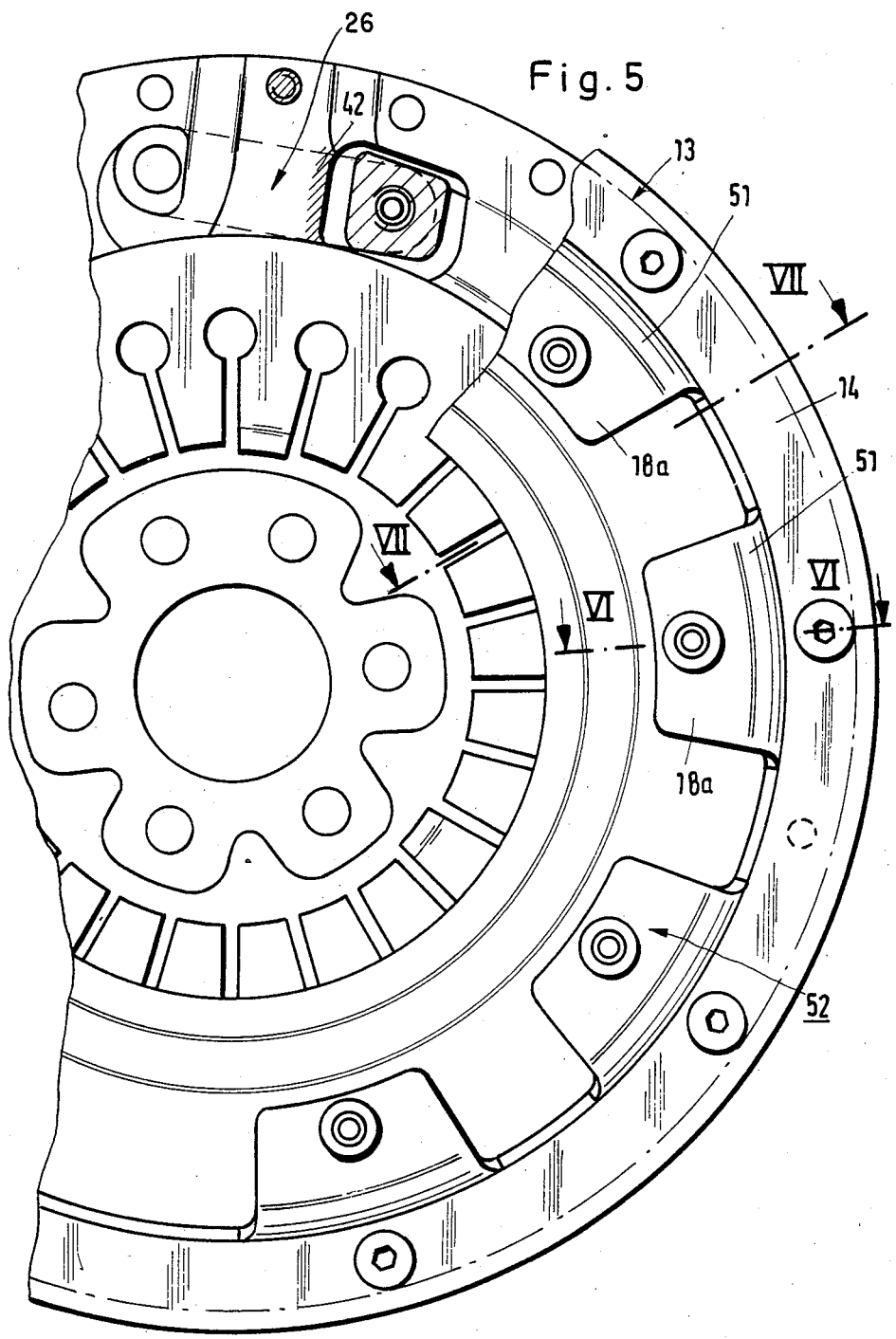

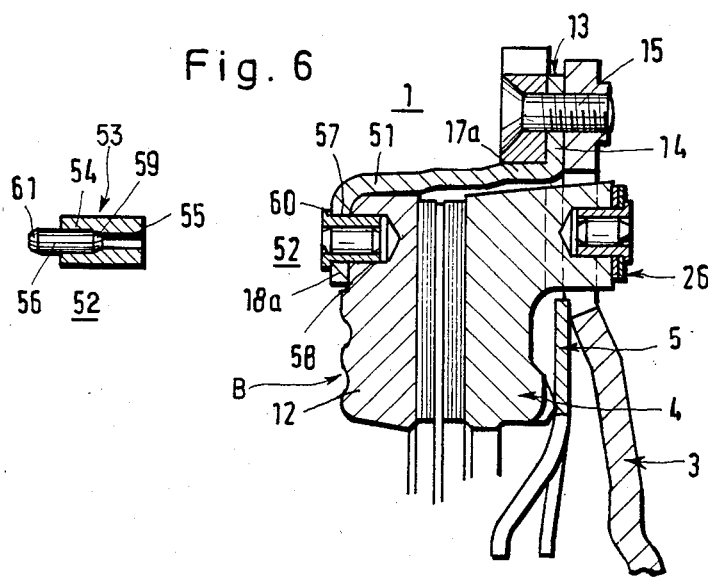
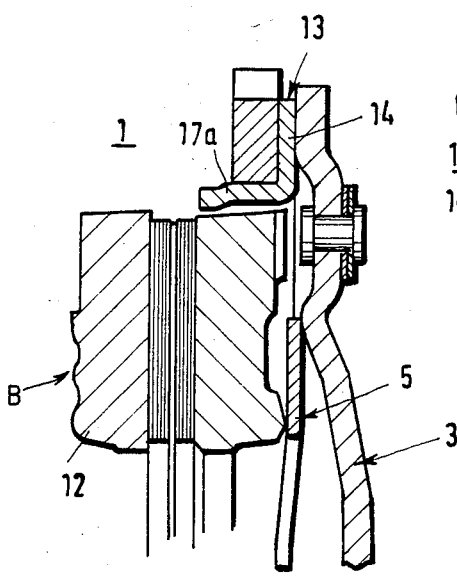
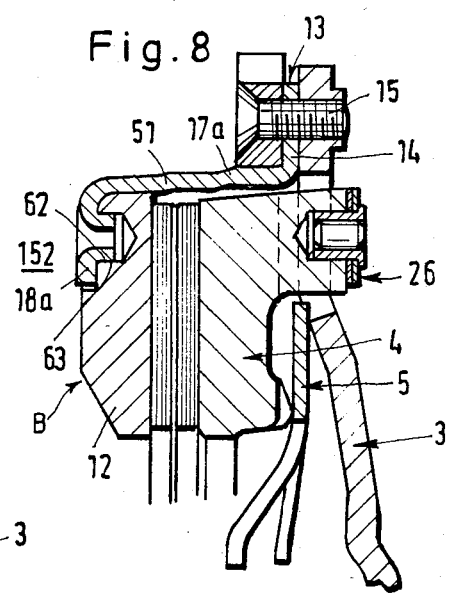

FRICTION CLUTCH

CROSS-REFERENCE TO RELATED CASE

FIGS. 1 to 4 of the drawing of the present application are identical with the drawing in the commonly owned copending patent application Ser. No. 06/592,235 filed March 22, 1984 for "Friction Clutch" by Albert Birk.

BACKGROUND OF THE INVENTION

The present invention relates to friction clutches, especially to friction clutches for use in motor vehicles. More particularly, the invention relates to improvements in friction clutches of the type wherein a substantially disc-shaped cover or support can be secured to the crankshaft of the internal combustion engine in a motor vehicle and serves to transmit torque to an axially movable pressure plate, wherein a diaphragm spring is interposed between the support and the pressure plate to bias the latter against the adjacent lining of a clutch disc, and wherein the support is rigidly connected with a counterpressure plate which is adjacent to another lining of the clutch disc. In such friction clutches, the support is connected with and rotates the counterpressure plate through the medium of a distancing device which provides between the support and the counterpressure plate adequate space for the clutch disc and the axially movable pressure plate. The latter normally receives torque from the support by way of several leaf springs.

In many presently known friction clutches of the above outlined character, the counterpressure plate is a casting made of grey iron and having integral projections which constitute the distancing means and are affixed to the support. If the support is a casting made of grey iron or another suitable metallic material, the distancing means can consist of or can include projections which are integral with the support. Irrespective of whether the projections are integral parts of the counterpressure plate or the support, they must exhibit a pronounced bursting strength and, for the reasons of manufacture, their dimensions in the radial direction of the pressure plate and clutch disc are invariably substantial. This contributes to space requirements and bulk of the friction clutch. Alternatively, the rather bulky projections necessitate a reduction of the diameter of the friction linings with attendant reduction of the area of contact between such linings and the two (pressure and counterpressure) plates. For example, if the friction clutch must fit into a given space which is available under the hood of a motor vehicle, and the dimensions of such space in the radial direction of the clutch are rather limited, the outer diameter of each friction lining must be reduced accordingly with attendant reduction of the maximum transmissible torque. Moreover, it is desirable to reduce the diameter of the friction clutch, without unduly reducing the diameters of the friction linings of the clutch disc, on the additional ground that any increase in the diameter of the clutch places the starter for the engine at a greater distance from the transmission, i.e., from the input shaft of the transmission. Such input shaft is driven by the clutch disc and the starter is normally installed at that side of the clutch which faces away from the engine, i.e., rather close to the counterpressure plate. In other words, the provision of a radially compact friction clutch, without unduly reducing the maximum transmissible torque, is of considerable interest to the designer of a motor vehicle, especially of a compact or subcompact vehicle. Moreover, if the starter is to be located at a considerable distance from the common axis of the counterpressure plate, clutch disc and pressure plate, the designer may have to redesign the entire space below the hood in order to provide room for the mounting of the starter at a greater than average distance from the axis of the change-speed transmission.

In accordance with another prior proposal, the counterpressure plate is a practically flat disc-shaped casting, the support is a piece of sheet metal and the distancing means comprises elongated fingers which are integral parts of the support. The fingers are secured to the counterpressure plate by screws which alternate with the fingers, as considered in the circumferential direction of the friction clutch, and are disposed in radially extending spaces between the fingers and the clutch disc. Such constructions do not contribute to an appreciable reduction of the radial dimensions of the friction clutch because the dimensions of the fingers (as considered radially of the counterpressure plate) are rather pronounced. This is due to the fact that the sheet metal of which the support is made is rather thick.

It was also proposed to construct the distancing means as a discrete part which is made of sheet metal, which is secured to the support and which has a recess for a split ring serving to hold the counterpressure plate against axial movement with reference thereto. The means for transmitting torque between the support and the counterpressure plate comprises radially outwardly extending projections which are received in the holes of the distancing part. A drawback of such proposal is that the distancing means contributes significantly to the initial and assembly cost of the clutch. Moreover, the distancing part must be rather thick, as considered in the radial direction of the clutch, in order to provide a groove of adequate depth for reception of the aforementioned split ring which holds the counterpressure plate against axial movement toward or away from the support. This contributes to the bulk, cost and weight of the clutch, especially to the bulk as considered in the radial direction of the counterpressure plate.

OBJECTS AND SUMMARY OF THE INVENTION

An object of the invention is to provide a novel and improved friction clutch which can be utilized with particular advantage in motor vehicles and is constructed and assembled in such a way that its space requirements (especially as considered in the radial direction) are a fraction of those of a conventional friction clutch having friction linings with the same outer diameters.

Another object of the invention is to provide a friction clutch wherein the friction linings can extend radially outwardly much closer to the radially outermost portions of the clutch than in heretofore known friction clutches.

A further object of the invention is to provide a friction clutch which, in addition to being surprisingly compact, as considered in the radial direction, is also shorter (as considered axially) than many heretofore known friction clutches.

Still another object of the invention is to provide a friction clutch wherein the space between the cover and the couterpressure plate is utilized with greater economy and greater efficiency than in heretofore known clutches.

An additional object of the invention is to provide a friction clutch which is more compact and hence more economical than heretofore known clutches and which is more reliable than the conventional clutches.

Another object of the invention is to provide a novel and improved method of assembling various components of a friction clutch for use in motor vehicles or the like.

An additional object of the invention is to provide a friction clutch which can employ surprisingly large friction linings in a relatively small space and wherein the transmission of torque between various rotary parts takes place in a novel and improved way.

A further object of the invention is to provide the friction clutch with novel and improved means for facilitating the assembly of its constituents and with novel and improved means for reliably securing the torque transmitting components to the parts which are attached thereto.

Another object of the invention is to provide the above outlined friction clutch with novel and improved means for connecting the counterpressure plate to the cover.

A further object of the invention is to provide novel and improved means for supporting an element of the starter for an internal combustion engine on the cover of the friction clutch.

An additional object of the invention is to provide a friction clutch wherein a single component can perform a surprisingly large number of various functions in a space-saving and economical manner.

A further object of the invention is to provide novel and improved fasteners for use in a clutch of the above outlined character.

An additional object of the invention is to provide the friction clutch with novel and improved means for centering various rotary constituents relative to one another.

The invention is embodied in a friction clutch, particularly for use in motor vehicles to establish or interrupt a torque transmitting connection between the output element (e.g., crankshaft) of an internal combustion engine and the input shaft of a change-speed transmission. The improved friction clutch comprises a substantially disc-shaped rotatable support or cover which is arranged to receive torque from the output element of the engine and has a first side facing toward and a second side facing away from the engine, an axially movable rotatable pressure plate which is adjacent to the second side of the support, a diaphragm spring which is interposed between the pressure plate and the support and has an outer portion (as considered radially of the pressure plate and support) which reacts against the support as well as a radially inner portion which bears against the pressure plate to urge the latter in a direction away from the second side of the support, means for transmitting torque between the support and the pressure plate as well as for yieldably opposing axial movement of the pressure plate away from the support (such torque transmitting means preferably comprises a set of leaf springs each having a first portion secured to the pressure plate and a second portion secured to the support), a counterpressure plate having a first side facing toward and a second side facing away from the pressure plate, a clutch disc which is interposed between the pressure plate and the counterpressure plate, and distancing means including a sheet metal component rigidly connecting the counterpressure plate to the support and having a clamping portion which engages the second side of the counterpressure plate.

The component of the distancing means is or can resemble a cup or hat and at least partially surrounds the periphery of the counterpressure plate. Such component preferably comprises means for holding the counterpressure plate against axial and/or angular movement relative to the support. For example, the counterpressure plate can be a press fit in the component. As a rule, the counterpressure plate will be provided with a cylindrical or substantially cylindrical peripheral surface having axially extending grooves therein, and the component of the distancing means then preferably includes a substantially cylindrical (tubular) portion surrounding the counterpressure plate and having ribs extending into the grooves of the peripheral surface; such ribs and grooves cooperate to hold the counterpressure plate against rotation relative to the distancing means and vice versa. The arrangement is preferably such that each rib has two substantially axially parallel lines of contact with the peripheral surface of the counterpressure plate, and the deepmost portion of each groove is preferably flanked by the respective lines of contact.

The clamping portion of the component preferably extends radially inwardly from the tubular or cylindrical portion, namely from that portion of the component which surrounds the counterpressure plate, the pressure plate and/or the friction linings of the clutch disc. Rivets are or can be provided to secure the clamping portion of the component to the counterpressure plate. Such rivets are preferably parallel to the common axis of rotation of the support, pressure plate, counterpressure plate and clutch disc, and each such rivet is preferably recessed into the counterpressure plate. If desired, each rivet can be an integral part of the clamping portion of the distancing component. At least in such instance, each rivet preferably constitutes or comprises a tubular member.

The component of the distancing means preferably comprises a circumferentially complete or interrupted radially outwardly extending flange, and such friction clutch further comprises fastener means for attaching the flange to the support as well as a gear which forms part of a starter for the engine and surrounds the component adjacent to the flange. The flange may include a plurality of angularly spaced discrete portions in the form of lugs or flaps each having a first side facing toward the marginal portion of the support and a second side facing toward the gear. The fastener means can include elements which not only secure the flange to the support but also secure the gear to the flange. To this end, the support can be provided with axially parallel tapped bores and the gear and the flange have holes in register with such tapped bores; the fastener means then comprises screws or bolts whose shanks extend into the respective tapped bores as well as through the registering holes of the gear and flange and whose heads hold the gear against movement in a direction away from the support.

The flange of the component of the distancing means is preferably provided with at least one first portion which is disposed between and is in contact with the gear as well as with the support, and at least one second portion which is angularly offset relative to the first portion and contacts only the support. Still further, the flange can be designed in such a way that it comprises one or more portions in contact with and one or more portions out of contact with the support.

At least one male centering member (e.g., an axially parallel pin) can be provided on the support, and the component of the distancing means (preferably the flange of such component) is then provided with a female centering member which receives the male centering member. The male centering member can be anchored in the support and can extend all the way to the first side of the support to be overlapped by a portion of one of the leaf springs which transmit torque between the support and the pressure plate. Such male centering member is preferably adjacent to that portion of the one leaf spring which is secured to the support. If the leaf springs are secured to the support by fastener means in the form of rivets, one of these rivets is preferably closely or immediately adjacent to the male centering member. Alternatively, at least one of these rivets can comprise an extension which constitutes the male centering member and extends into a slot or hole in the female centering member of the component of the distancing means.

The clutch disc normally comprises two friction linings, one for the pressure plate and the other for the counterpressure plate. The component of the distancing means comprises or can comprise a substantially cylindrical portion which spacedly surrounds the clutch disc and has at least one opening disposed radially outwardly of the friction lining or linings.

The aforementioned component can comprise an annulus of prongs. Such prongs preferably extend from the aforediscussed cylindrical or tubular portion of the component and portions (e.g., the tips) of such prongs can constitute the clamping portion of the component. In other words, the clamping portion of the component can be constituted by an annulus of prongs each of which includes a radially extending portion adjacent to the second side of the counterpressure plate and an axially parallel portion which is outwardly adjacent to the peripheral surface of the counterpressure plate and is integral with the cylindrical portion of the component.

If the clamping portion is secured to the counterpressure plate by rivets, the second side of the counterpressure plate can be provided with a blind bore for each of the rivets. Each such rivet can comprise a tubular member at least a part of which extends into the respective bore of the counterpressure plate. Each tubular member preferably comprises a radially expanded portion the exterior of which is in form locking engagement with the surface bounding the respective bore. The surfaces bounding the respective bores are preferably profiled and the exterior of each tubular member has a complementary profile to thus prevent extraction of tubular members from their bores. For example, each such profile can exhibit one or more threads. The tubular members are preferably made of a ductile material which can be expanded radially into form locking engagement with the adjacent material of the counterpressure plate.

Each of the just discussed rivets can further comprise a stud or an analogous insert which is driven into the corresponding tubular member and maintains the latter in form locking engagement with the counterpressure plate. The front end portion of each studlike insert (i.e., that end portion which is nearer to the bottom of the respective blind bore) is preferably of conical, pyramidal or semispherical shape to allow for convenient introduction into the respective tubular member. The tubular members are preferably provided with heads which overlie the clamping portion to hold the latter from movement away from the second side of the counterpressure plate or vice versa. The heads of the tubular members preferably overlie (at least in part) the respective inserts to prevent their escape or expulsion from the corresponding tubular members.

The novel features which are considered as characteristic of the invention are set forth in particular in the appended claims. The improved friction clutch itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is an axial sectional view of a friction clutch which embodies one form of the invention;

FIG. 1a is an enlarged fragmentary sectional view as seen in the direction of arrows from the line Ia—Ia of FIG. 1, FIG. 2 is a fragmentary partly end elevational and partly sectional view as seen in the direction of arrows from the line II–II of FIG. 1;

FIG. 3 is a fragmentary sectional view as seen in the direction of arrows from the line III–III of FIG. 2;

FIG. 4 is a fragmentary sectional view of a detail in a modified friction clutch;

FIG. 5 is a fragmentary partly elevational and partly sectional view of a third friction clutch;

FIG. 6 is a fragmentary sectional view as seen in the direction of arrows from the line VI–VI of FIG. 5;

FIG. 7 is a fragmentary sectional view as seen in the direction of arrows from the line VII–VII of FIG. 5; and FIG. 8 is a fragmentary sectional view similar to that of FIG. 6 but showing a portion of a fourth friction clutch.

DESCRIPTION OF THE PREFERRED EMBODIMENTS

Referring first to FIGS. 1, 2 and 3, there is shown a friction clutch 1 which is installed in a motor vehicle and has a disc-shaped annular cover or support 3 receiving torque from the output element 102 (e.g., crankshaft) of the internal combustion engine of the motor vehicle. The means for transmitting torque from the crankshaft 102 to the support 3 includes a flange 2 at the left-hand end of the crankshaft, as viewed in FIG. 1, and bolts 202 or analogous means for securing the central portion of the support 3 to the flange 102. The support 3 has an outer side A which faces toward and an inner side which faces away from the engine including the crankshaft 102.

The friction clutch 1 further comprises an annular pressure plate 4 which is movable axially toward and away from the inner side of the support 3, and an annular diaphragm spring 5 having a radially outer marginal portion 6 reacting against the adjacent projections 7 at the inner side of the support 3 and a radially inner portion 8 abutting against projections 9 at the right-hand side of the pressure plate 4, as viewed in FIG. 1. The diaphragm spring 5 is installed in prestressed condition so that its radially inner portion 8 bears against the projections 9 and urges the pressure plate 4 in a direction to the left, as viewed in FIG. 1, namely toward frictional engagement with the right-hand annular friction lining 10 on a clutch disc 11 which is installed between the pressure plate 4 and a counterpressure plate 12 of the friction clutch 1. When the clutch 1 is engaged, the diaphragm spring 5 causes the pressure plate 4 to bear against the adjacent friction lining 10 and to thereby urge the other friction lining 10 of the clutch disc 11 against the adjacent side of the axially fixed counterpressure plate 12. The clutch disc 11 then transmits torque to a hub 111 which is connected to the input element of a change-speed transmission in the motor vehicle. The transmission of torque from the linings 10 to the hub 111 takes place, at least during certain stages of operation of the clutch 1, through the medium of energy storing elements in the form of coil springs 211 of which only one can be seen in FIG. 1.

The counterpressure plate 12 is fixedly connected to the support 3 by a distancing device 13 which is a hat-like or cupped annular component made of deformable sheet metal stock. The arrangement is such that the distancing device 13 maintains the counterpressure plate 12 at a preselected distance from the support 3 and also compels the plate 12 to share all angular movements of the support 3 when the latter is rotated by the crankshaft 102 of the engine. The radially outermost portion 14 of the distancing device 13 constitutes an outwardly flaring flange which is affixed to the radially outermost portion of the support 3 by screws 15 or other suitable fasteners. The fasteners 15 further serve to connect the support 3, the distancing device 13 and the counterpressure plate 12 with a ring gear 16 which forms part of the starter for the engine and whose teeth extend radially outwardly beyond the peripheral surfaces of the support 3 and flange 14. The internal surface of the ring gear 16 is preferably a press fit on the external surface of the substantially axially extending cylindrical central portion 17 of the distancing device 13; this centers the distancing device and enhances its resistance to deformation. The radially innermost portion of the distancing device 13 is a ring-shaped clamping collar 18 recessed into a complementary annular socket in that (outer) side B of the counterpressure plate 12 which faces away from the clutch disc 11 and pressure plate 4. The clamping portion or collar 18 may constitute a circumferentially complete member or it may comprise an annulus of discrete prongs each of which is bent to extend into the corresponding socket at the exposed outer side B of the counterpressure plate 12. The peripheral surface of the counterpressure plate 12 is preferably a press fit in the adjacent part of the tubular central portion 17 of the distancing device 13 so that the latter holds the plate 12 against axial movement toward the support 3. Still further, the tubular central portion 17 of the distancing device 13 preferably serves to hold the counterpressure plate 12 against rotation relative to the support 3, especially if the collar 18 is a circumferentially complete member which cannot prevent rotation of the plate 12 with reference to the support. As shown in the lower portion of FIG. 1, the periphery of the counterpressure plate 12 is provided with substantially axially parallel grooves or flutes 20 (only one of these grooves is actually shown) for complementary axially parallel ribs 19 of the central portion 17 of the distancing device 13. The grooves 20 and the ribs 19 need not be parallel to the common axis of the central portion 17 and counterpressure plate 12; this even further reduces the likelihood of axial movability of the counterpressure plate 12 in the distancing device 12.

FIG. 1a shows that each rib 19 of the distancing device 13 can be held in contact with the peripheral surface of the counterpressure plate 12 along two straight lines K which are parallel to the axis of the tubular portion 17. The lines K flank the deepmost portion of the respective groove 20 in the peripheral surface of the counterpressure plate 12. FIG. 1a also shows that each rib 19 can constitute an inwardly extending deformed portion of the central portion 17 of the distancing device 13. However, it is also possible to weld or otherwise secure separately produced ribs at the inner side of the portion 17.

The means for disengaging the clutch 1 comprises a centrally located plunger 21 which extends with clearance through the hub 111 of the clutch disc 11 and can pivot the diaphragm spring 5 at 6, 7 through the medium of a motion transmitting disc 22 having a radially outermost portion 22a abutting against the tips of the radially inwardly extending fingers or prongs 105 (see FIG. 2) of the diaphragm spring 5. When the plunger 21 is moved in a direction to the right, as viewed in FIG. 1, the disc 22 causes the radially inner portion 8 of the diaphragm spring 5 to move away from the counterpressure plate 12 so that the pressure plate 4 can move axially toward the inner side of the support 3 to thereby relax the pressure upon the adjacent friction lining 10. This results in disengagement of the linings 10 from the plates 4, 12 so that the crankshaft 102 can rotate with reference to the hub 111. The pressure plate 4 is biased axially of and away from the counterpressure plate 12 by a set of torque transmitting leaf springs 26 each of which has a first portion 26a secured to the pressure plate 4 and a second portion 26b secured to the support 3. The bias of the leaf springs 26 is weaker than the bias of the diaphragm spring 5 when the latter is free to urge the pressure plate 4 toward the counterpressure plate 12 so that the clutch 1 is automatically engaged against the opposition of the leaf springs 26 as soon as the plunger 21 is retracted in a direction to the left, as viewed in FIG. 1.

The pressure plate 4 is formed with an annulus of preferably equidistant protuberances 23 (as considered in the circumferential direction of the support 3) which extend axially through complementary openings or cutouts 24 in the support 3. The protuberances 23 are disposed radially outwardly of the radially outer marginal portion 6 of the diaphragm spring 5 and at least the major portion of each protuberance 23 is disposed radially inwardly of the peripheral or outer marginal portions 10a of the linings 10 of the clutch disc 11. This contributes to compactness of the friction clutch 1 because the first portions 26a of the leaf springs 26 are connected to discrete protuberances 23, i.e., such first portions 26a of the leaf springs need not extend radially outwardly beyond the friction linings 10. Each protuberance 23 has a flat end face or platform 25 which constitutes an abutment for the first portion 26a of the respective leaf spring 26.

At least a portion of each leaf spring 26 is outwardly adjacent to the outer side A of the support 3. In the embodiment of FIGS. 1 to 3, each of the leaf springs 26 is mounted in its entirety at the outer side A of the support 3, i.e., the exposed sides of the leaf springs 26 face the engine which includes the crankshaft 102. In other words, the leaf springs 26 need not extend into the space or chamber between the inner side of the support 3 and the counterpressure plate 12. The second portion 26b of each leaf spring 26 is secured to the outer side A of the support 3. The latter comprises an annulus of raised portions 28 extending in the axial direction of the clutch 1 and away from the pressure plate 4 and alternating with recessed portions 29 extending axially of the clutch but in a direction toward the pressure plate 4. The first portions 26a of the leaf springs 26 are secured to the respective protuberances 23 in the regions of the recessed portions 29, and the second portions 26b of the leaf springs 26 are secured to the outer sides of the respective raised portions 28. The aforediscussed openings 24 of the support 3 are provided in the recessed portions 29.

The fastener means which is used to secure the second portions 26b of the leaf springs 26 to the raised portions 28 of the support 3 comprises rivets 30. Each of these rivets has a head 31 which is disposed at the inner side of the support 3 and is in register with a discrete flat platform 32 at the respective side of the axially movable pressure plate 4. Each of these platforms serves as an anvil for the making of the respective rivet head 31. Alternatively, each rivet 30 can be provided with a prefabricated head 31 which abuts against the respective platform or anvil 32 during the making of the other head 33 at the outer side A of the support 3. If the head 33 is formed prior to securing of the respective rivet 30 to the support 3, the head 31 is formed as a result of pressing of the partially finished rivet 30 against the respective platform 32. Irrespective of the exact nature of the riveting operation, the distance between each finished or prefabricated rivet head 31 and the respective platform 32 is such that the pressure plate 4 has adequate room for movement away from the counterpressure plate 12 regardless of the degree of wear upon the plates 4, 12 and linings 10, i.e., also when the clutch 1 is new.

The first portions 26a of the leaf springs 26 are secured to the respective protuberances 23 of the pressure plate 4 by special rivets 34 of the type shown in the upper portion of FIG. 1 and in FIG. 3. To this end, each of the protuberances 23 is provided with a blind bore 35 bounded by an undulate, threaded or otherwise profiled surface which is engaged by the complementary outer surface 37 of a plastically deformed tubular member 36 constituting or forming part of the respective rivet 34. Prior to deformation of its outer end portion, each tubular member 36 extends outwardly beyond the exposed side of the first portion 26a of the respective leaf spring 26. This is indicated in FIG. 3 by phantom lines. A spreading element or insert in the form of a cylindrical stud 38 is then introduced into the axial bore of the tubular member 36 to expand the latter into full surface-to-surface engagement with the respective protuberance 23 and to thus anchor such tubular member in the pressure plate 4. The inner diameter of the undeformed (i.e., unexpanded) tubular member 36 is smaller than the diameter of the respective stud 38 to thus ensure predictable and reliable expansion of the tubular member so that the configuration of its external surface invariably conforms to the configuration of the surface bounding the respective bore 35. The innermost or front end portion 39 of the stud 38 tapers toward the bottom of the respective blind bore 35 so that the stud 38 can be readily introduced into the corresponding tubular member 36. Each stud 38 is preferably further provided with a second tapering end portion or tip 40 which tapers in a direction away from the bottom of the respective blind bore 35 and is at least partially embedded in the material of the corresponding tubular member 36 when the latter is deformed at the outer side of the first portion 26a of the respective leaf spring 26 so as to resemble a head 41 which not only overlies the outer side of the respective leaf spring 26 but also completely or partially confines the corresponding tip 40 to thus prevent accidental expulsion of the stud 38 from the bore of the associated tubular member 36.

The rivets 34 can be replaced with screws or bolts which are driven home into the blind bores 35 of the protuberances 23. The utilization of the illustrated rivets 34 is preferred at this time because they are simple to install, compact and inexpensive.

The end portions or tips 39 and 40 of the inserts or studs 38 can have a pyramidal, conical, semispherical or analogous shape, as long as they allow for convenient introduction of the inserts into the respective tubular members 36 and as long as they can be readily embedded in the material of the respective heads 41 when the outer end portions of the corresponding tubular members 36 undergo deformation to overlie the outer sides of the first portions 26a of the corresponding leaf springs 26. The heads 41 can be formed simultaneously with forcible introduction of inserts 38 into the respective tubular members 36 or in a subsequent step. The end portions 40 of the inserts 38 can be partially or completely embedded in the material of the respective heads 41.

Those sections (42) of the outer side A of the support 3 which are outwardly adjacent to the recessed portions 29 and are overlapped by the third or median portions 26c of the corresponding leaf spring 26 are calibrated so as to allow for requisite axial movements of the pressure plate 4 toward and away from the counterpressure plate 12. The levels of the sections 42 are selected in such a way that they can be contacted by the third portions 26c of the adjacent leaf springs 26 only when the wear upon the pressure plate 4 and the lining or linings 10 of the clutch disc 11 has progressed to the maximum permissible value. Each of the sections 42 is immediately or closely adjacent to the respective rivet 34, i.e., to the respective protuberance 23 of the pressure plate 4. As a rule, the wear upon the linings 10 will be most pronounced and the levels of the calibrated sections 42 are selected with a view to enable the median portions 26c of the leaf springs 26 to bear against such sections 42 only when the wear upon the linings 10 has progressed all the way or close to the maximum permissible value. On the other hand, the selection of the levels of the calibrated sections 42 should be such as to prevent excessive stretching of the leaf springs 26 at the time the support 3 is still assembled only with the pressure plate 4 and diaphragm spring 5. It will be recalled that the diaphragm spring 5 is installed in prestressed condition so that it automatically moves the pressure plate 4 away from the inner side of the support 3 as soon as the parts 3, 4 and 5 are assembled but the counterpressure plate 12 is yet to be secured to the support 3 by the distancing device 13.

The calibrated sections 42 of the outer side A of the support 3 also prevent excessive stretching and/or other types of deformation of the leaf springs 26 during storage and/or transport of prefabricated units each of which includes the support 3, the pressure plate 4, the prestressed diaphragm spring 5 between the parts 3, 4 and the leaf springs 26 as well as the rivets 30, 34 which secure the leaf springs to the support and pressure plate. Still further, such calibrated sections 42 protect the leaf springs 26 during assembly of the just described units with the remaining parts of the friction clutches as well as subsequent to attachment of a unit including the parts 3, 4, 5, 26, 30, 34 to the crankshaft 102 but prior to attachment of the distancing device 13 and counterpressure plate 12 to the support 3. Calibration of all sections 42 of the outer side A of the support 3 is desirable and advantageous in order to reliably prevent excessive stretching of the leaf springs 26 under the aforeenumerated circumstances as well as to ensure that the diaphragm spring 5 will stress each of the leaf springs 26 to the same extent.

In order to facilitate assembly of the friction clutch 1, and particularly the attachment of the distancing device 13 to the support 3, the clutch comprises at least one male orienting or centering member in the form of a pin 43 which is mounted in the support 3 and can be received in a properly dimensioned opening 44 of the adjacent female centering portion or member 45 of the flange 14 of the distancing device 13. The latter is assembled with the support 3 subsequent to insertion of the counterpressure plate 12 into its interior and subsequent to placing of the clutch disc 11 between the plates 4 and 12. The opening 44 need not be circular but may constitute an elongated closed slot extending radially of the support 3 and having a width which matches or only slightly exceeds the diameter of the centering pin 43. The opening 44 is machined into or otherwise formed in the pocket-like raised female centering portion 45 of the flange 14 of the distancing device 13. The portion 45 extends in a direction toward the inner side of the support 3, i.e., toward the engine which includes the crankshaft 102. Such portion 45 is received in the respective raised portion 28 of the support 3. The centering pin 43 is received in a sleeve 46 which is anchored in the respective raised portion 28 and extends into the opening 44 of the raised portion 45 of the flange 18 on the distancing device 13. As indicated in the lower portion of FIG. 1 by phantom lines, a part 27 of the second portion 26b of the respective leaf spring 26 can overlie the outer end face of the sleeve 46 and/or centering pin 43 so as to prevent accidental expulsion of the part 43 and/or 46 during assembly of the friction clutch 1.

The distancing device 13 need not always constitute a separately manufactured part which is thereupon assembled with the support 3 and counterpressure plate 12. For example, the illustrated distancing device 13 can be replaced with integral extensions or prongs of the counterpressure plate 12, especially if the latter is a casting made of gray iron, spheroidal graphite cast iron or the like. Alternatively, the illustrated distancing device 13 can be replaced with a ring which is inserted between the support 3 and the counterpressure plate 12. The illustrated distancing device 13 is preferred at this time because the presently preferred mode of assembling the friction clutch 1 is as follows: The support 3 is assembled with the pressure plate 4, prestressed diaphragm spring 5 and leaf springs 26 into a prefabricated unit which is secured to the flange 2 of the crankshaft 102 by means of the aforedescribed bolts 202. In the next step, the radially outermost portion 22a of the clutch-disengaging disc 22 is secured to the prongs 105 of the diaphragm spring 5, as at 122. In a further step, the clutch disc 11 is placed adjacent to the pressure plate 4 and the distancing device 13, with the counterpressure plate 12 already installed therein, is then secured to the support 3 by means of screws 15. The centering pin 43 facilitates proper orientation of the distancing device 13 relative to the support 3 during application of the screws 15. More than one centering pin can be used if desired or necessary. Such centering pin or pins are especially desirable and advantageous when the friction clutch is assembled from several preassembled modules one of which includes the support 3, the pressure plate 4, the prestressed diaphragm spring 5, the leaf springs 26, and the rivets 30 and 34.

FIG. 4 shows a portion of a modified friction clutch wherein at least one of the rivets 30 is replaced with a modified rivet 47 having a pin-shaped extension 49 constituting a centering pin and being received in a radially extending open slot 144 of the flange 14 of the distancing device 13. The rivet 47 has an intermediate head 48 which is disposed between the flange 14 and the inner side of the support 3 and an outer head 50 which is outwardly adjacent to the second portion 26b of the respective leaf spring 26. That portion of the rivet 47 which is disposed between the heads 48, 50 extends through registering holes of the support 3 and leaf spring 26. The open slot 144 can be replaced with a radially extending closed slot (which terminates short of the peripheral surface of the flange 14) or with a circular opening without departing from the spirit of the invention. The provision of an open or closed radially extending centering slot for the centering pin 43 or 49 is preferred at this time because this allows for some radial displacement of component parts of the clutch when the ring gear 16 is forcibly applied to the exterior of the median portion of the distancing device 13. Such radial displacement can take place prior to attachment of the distancing device 13 to the support 3, i.e., at the time the parts 13 and 16 are assembled into a prefabricated unit which is then attached to the support 3. In either event, a radially extending centering slot allows for at least some compensation which is necessary due to minute distortion of the assembly of parts 13, 16 as a result of forcible mounting of the part 16 on the median portion 17.

As a rule, the intermediate head 48 will be formed prior to insertion of the major portion of the rivet 47 into the registering holes of the second portion 26b of the respective leaf spring 26 and of the support 3, and the head 50 is formed subsequent to such insertion. The friction clutch can comprise several rivets of the type shown in FIG. 4.

In the embodiment which is shown in FIGS. 1 to 3, each of the leaf springs 26 is installed, in its entirety, at the outer side A of the support 3. This renders it possible to greatly reduce the dimensions of the friction clutch 1, as considered in the radial direction of its rotary parts, because the support 3 and/or the pressure plate 4 need not be provided with radially outwardly extending projections or protuberances for attachment of the leaf springs 26 thereto. Instead, the protuberances 23 extend in the axial direction of the pressure plate 4 and at least the major part of each such protuberance can be located radially inwardly of the peripheral portions 10a of the friction linings 10. By providing the support 3 with openings 24 for the protuberances 23, it is further possible to reduce the dimensions of the friction clutch 1 in the axial direction of the pressure plate 4. As can be readily seen in FIGS. 1 and 3, the first end portions 26a of the leaf springs 26 are adjacent to the respective end faces 25 which, in turn, are outwardly adjacent to the outer side A of the support 3; the second portions 26b of the leaf springs 26 are evidently and necessarily outwardly adjacent to the outer side A since they are attached to the outer sides of the respective raised portions 28 of the support 3; and the median portions 26c of the leaf springs 26 are outwardly adjacent to the sections 42 which form part of the outer side A. The axial dimension of the friction clutch 1 would have to be increased if the leaf springs 26 were installed at the inner side of the support 3, for example, as shown in FIG. 5 of U.S. Pat. No. 3,712,435 granted Jan. 23, 1973 to Kraus. The savings in space, as considered in the axial direction of the pressure plate 4, do not arise only due to the fact that the leaf springs 26 themselves are located at the outer side A of the support 3 but also because the rivets for such leaf springs need not be installed in the space between the pressure plate 4 and the support 3.

Another important advantage of the placing of portions of or the entire leaf springs 26 at the outer side A of the support 3 is that the leaf springs are subjected to much less pronounced thermal stresses which, in turn, reduces the losses in load due to set. This enhances the reliability of operation of the improved friction clutch and prolongs its useful life.

Still another important advantage of the improved friction clutch over conventional clutches wherein the leaf springs are disposed at the inner side of the support is that the outer diameter of the diaphragm spring 5 is not dependent at all or is less dependent upon the manner of mounting the leaf springs. Thus, at least the second portions 26b of the leaf springs 26 can be located, at least in part, radially inwardly of the portion 6 of the diaphragm spring 5.

Additional savings in space (as considered in the axial direction of the friction clutch 1) are achieved because the first portions 26a of the leaf springs 26 are secured to the raised portions 28 of the support 3 and because the latter has recessed portions 29 with openings 24 for the protuberances 23 of the pressure plate 4.

An advantage of the clamping portion 18 is that it allows for the making of the distancing device 13 from a relatively thin metallic sheet stock with attendant reduction of the diameter of the friction clutch or an increase of the outer diameters of the friction linings 10. Moreover, a lightweight distancing device 13 contributes to a reduction of the bulk and weight of the entire friction clutch and to lower cost of such apparatus. The sheet-metal device 13 can be mass produced in available machines at a reasonable cost and in any one of a variety of different sizes and shapes. Still further, the connection between the counterpressure plate 12 and the distancing device 13 is simple, reliable and long-lasting to thus guarantee longer useful life of the friction clutch. The feature that the flange 14 of the distancing device 13 can be connected to the support 3 as well as to the starter gear 16 by one and the same set of screws 15 or analogous fasteners also contributes to compactness and lower cost of the friction clutch. All that is necessary is to provide the marginal portion of the support 3 with an annulus of tapped bores for the shanks of the screws 15 and to provide the flange 14 and the gear 16 with holes which register with such tapped bores. The heads of the screws 16 overlie the exposed side of the gear 16 to thus hold the latter and the flange 14 against axial movement in a direction away from the support 3.

The couterpressure plate 12 can constitute a casting which is a press fit in the distancing device 13. Such mode of assembling the parts 12 and 13 further reduces the likelihood of axial and/or angular movement of the counterpressure plate 12 relative to the distancing device 13 and support 3.

In order to ensure adequate ventilation and cooling of the improved friction clutch, the cylindrical portion 17 of the distancing device 13 is preferably provided with at least one but preferably more openings 64 (see the upper part of FIG. 1) which are radially outwardly adjacent to the friction linings 10 and are preferably equidistant from one another, as considered in the circumferential direction of the central portion 17.

The flange 14 of the distancing device 13 can constitute a circumferentially complete brim-shaped or washer-like body. Alternatively, such flange can be assembled of an annulus of discrete prongs or lugs which extend radially outwardly from that end of the cylindrical central portion 17 which is adjacent to the marginal portion of the support 3. The clamping portion of the distancing device 13 can be a circumferentially complete body 18 or a series of prong portions 18a irrespective of whether the flange 14 is a circumferentially complete washer or is made up of an annulus of discrete lugs each of which is integral with the cylindrical portion of the distancing device.

FIG. 1 further shows that the flange 14 of the distancing device 13 can have an undulate shape with portions nearer to (in actual abutment with) and portions more distant from the marginal portion of the support 3. The portions 14b (one shown in the upper portion of FIG. 1) are in actual contact with the support 3 as well as with the respective side of the starter gear 16 on the central portion 17. The aforementioned female centering portions or members 45 constitute those portions of the flange 14 which are or which may be in actual contact with the marginal portion of the support 3 but are spaced apart from the adjacent side of the starter gear 16. The part 44a of each portion 45 of the flange 14 is or can be provided with an opening 44 or a radially extending slot (see the slot 144 in FIG. 4) for the respective male centering member 43 and its sleeve 46.

Still further, the flange 14 is or can be provided with portions (such as the parts 44a) which are in actual contact with the marginal portion of the support 3 as well as portions 65 (one shown in the lower portion of FIG. 1) which are out of contact with the support 3. The portions 65 alternate with the parts 44a.

The provision of an undulate flange 14 (having portions in and portions out of contact with the marginal portion of the support 3 and/or gear 16) allows for better ventilation and cooling of the friction clutch. The same holds true if the flange 14 constitutes an annulus of discrete lugs which extend radially outwardly from the circumferentially complete portion of the distancing device 13.

FIGS. 5 to 7 illustrate a modified friction clutch 1 wherein the clamping portion of the cupped or hat-shaped distancing device or component 13 is not a circumferentially complete ring or washer but rather an annulus of radially inwardly extending prongs or portions of prongs which are integral with the brim-shaped flange 14 of the device 13. Actually, the flange 14 of the distancing device 13 is integral with a circumferentially complete cylindrical or substantially cylindrical (axially extending) central portion 17a, and the latter is integral with prongs 51 each including an axially parallel portion outwardly adjacent to the peripheral surface of the counterpressure plate 12 and a radially inwardly extending portion 18a. Such radially inwardly extending portions 18a together constitute the clamping portion of the distancing device 13 and overlie the outer side B of the counterpressure plate 12.

The grooves 20 and ribs 19 of FIG. 1a are replaced with a different torque transmitting means in the form of rivets 52 which affix the portions 18a of the prongs 51 to the counterpressure plate 12 so that the latter is compelled to share all angular movements of the support 3. The details of one of the rivets 52 are shown in FIG. 6. This rivet 52 is similar to the rivets 34 which secure the first portions 26a of the leaf springs 26 to the respective protuberances 23 of the pressure plate 4. Each rivet 52 comprises a plastically deformable tubular member 53 having an axially extending bore including a larger-diameter portion 54 and a smaller-diameter portion 55. The larger-diameter portion 54 receives a portion of a cylindrical stud or insert 56 before it is inserted into the hole 58 of the respective prong portion 18a and the registering blind bore 58 of the counterpressure plate 12. The surface surrounding the blind bore 58 is undercut; it can have a thread or one or more circumferentially complete recesses so that it is not exactly cylindrical. When the tubular member 53 is inserted into the respective hole 57 and blind bore 58, the insert or stud 56 is driven into the smaller-diameter portion 55 of the axial bore of the tubular member 53 so that the latter expands and its external surface assumes a profile which conforms to the profile of the surface surrounding the blind bore 58 in the counterpressure plate 12. This ensures that the tubular member 53 is safely anchored in the counterpressure plate 12. As can be seen in the left-hand portion of FIG. 6, which shows a tubular member 53 and a stud 56 prior to insertion into the hole 57 of a prong portion 18a and into the registering blind bore 58 of the counterpressure plate 12, the front end portion 59 of the stud tapers in a direction toward the bottom of the blind bore 58 to facilitate insertion of the stud 56 into the larger-diameter portion 54 of the axial bore in the tubular member 53 as well as to facilitate penetration of the stud 56 deeper into the tubular member 53. The stud 56 thereby displaces the material of the tubular member 53 radially outwardly into form-locking engagement with the counterpressure plate 12. The securing of the rivet 52 to the counterpressure plate 12 and to the respective prong portion 18a is completed after the outer end portion of the inserted tubular member 53 is formed with a head 60 which overlies the respective prong portion 18a and thus holds the distancing device 13 against axial movement relative to the counterpressure plate 12 and/or vice versa. Moreover, the material of the head 60 preferably overlies at least a portion of the outwardly tapering end portion 61 of the inserted stud 56 so that the latter cannot escape from the respective tubular member 53. The end portions 59, 61 of the stud 56 can have a pyramidal, conical or hemispherical shape. The end portion 61 can be completely or partly embedded in the material of the head 60. The making of the head 60 can take place prior to insertion of the tubular member 53 into its blind bore 57, simultaneously with the driving of stud 56 into the tubular member 53 (i.e., by means of the tool which is used to drive the stud 56 deeper into the tubular member 53), or in a subsequent step.

While it is also possible to connect the distancing device 13 and the counterpressure plate 12 to each other by a set of radially extending rivets, the illustrated (axially parallel) rivets 52 are preferred at this time because they contribute to compactness of the friction clutch, as considered in the radial direction of the clutch disc 11 and pressure plate 4. If desired, the connection between the counterpressure plate 12 and the distancing device 13 can comprise radially and axially extending rivets or analogous fasteners.

FIG. 8 illustrates a portion of a further friction clutch wherein the rivets 152 which are used to secure the prong portions 18a to the counterpressure plate 12 constitute integral tubular parts of the distancing device 13. Thus, the portion 18a of each prong 51 of the distancing device 3 is deformed to form a tube 62 extending into the corresponding blind bore 63 in the outer side B of the counterpressure plate 12. The surface surrounding the blind bore 63 is preferably grooved, threaded or otherwise profiled to be capable of holding the respective tubular member 62 against axial movement relative to the counterpressure plate 12. The tool which serves to expand each tubular member 62 radially outwardly subsequent to introduction into the respective blind bore 63 is not specifically shown in FIG. 8; such tool can be provided with a working end resembling the stud 56 which is shown in FIG. 6.

The tubular portions 62 of the rivets 152 can be formed prior to preferably forcible introduction of the counterpressure plate 12 into the distancing device 13. The tubular portions 62 are thereupon expanded in the radial direction by resort to the aforementioned or an analogous tool so as to further reduce the likelihood of axial and/or angular movement of the counterpressure plate 12 with reference to the distancing device 13 and support 3. Centering means may be provided to ensure that each tubular portion 62 will find its way into the respective blind bore 63 as a result of forcible introduction of the counterpressure plate 12 into the distancing device 13.

If desired, each rivet 152 can further comprise a stud (similar to the stud 56 of FIG. 6) which serves to expand the respective tubular member 62 and to thereupon remain in the radially expanded tubular member while the clutch is in actual use.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A friction clutch, particularly for use in motor vehicles, comprising a substantially disc-shaped rotatable support arranged to receive torque from the output element of an engine and having a first and a second side; an axially movable pressure plate adjacent to one side of said support; a diaphragm spring interposed between said pressure plate and said support and having an outer portion, as considered radially of said pressure plate, reacting against said support and a radially inner portion bearing against said pressure plate; means for transmitting torque between said support and said pressure plate; a counterpressure plate having a first side facing toward and a second side facing away from said pressure plate; a clutch disc interposed between said pressure plate and said counterpressure plate; and distancing means including a sheet metal component rigidly connecting said counterpressure plate to said support and having a clamping portion engaging the second side of said counterpressure plate.

2. The friction clutch of claim 1, wherein said component is cupped and at least partially surrounds the periphery of said counterpressure plate.

3. The friction clutch of claim 1, wherein said component includes means for holding said counterpressure plate against axial and/or angular movement relative to said support.

4. The friction clutch of claim 1, wherein said component is cupped and said counterpressure plate is a press fit in said cupped component.

5. The friction clutch of claim 1, wherein said counterpressure plate has a substantially cylindrical peripheral surface and substantially axially parallel grooves in said peripheral surface, said component including a substantially cylindrical portion surrounding the peripheral surface of said counterpressure plate and having ribs extending into said grooves.

6. The friction clutch of claim 5, wherein each of said ribs has two lines of contact with the peripheral surface of said counterpressure plate.

7. The friction clutch of claim 6, wherein each of said grooves includes a deepmost portion and the lines of contact of the respective rib flank such deepmost portion.

8. The friction clutch of claim 1, wherein said component includes a tubular portion at least partially surrounding said counterpressure plate and said clamping portion of said component extends substantially radially inwardly of said tubular portion.

9. The friction clutch of claim 8, further comprising rivets securing said clamping portion to said counterpressure plate.

10. The friction clutch of claim 9, wherein said rivets are parallel to the axis of said pressure plate.

11. The friction clutch of claim 10, wherein each of said rivets is recessed into said counterpressure plate.

12. The friction clutch of claim 9, wherein each of said rivets is integral with said clamping portion.

13. The friction clutch of claim 12, wherein each of said rivets is a tubular member.

14. The friction clutch of claim 1, wherein said component includes a substantially radially outwardly extending flange, and further comprising fastener means for attaching said flange to said support and a starter gear surrounding said component and being adjacent to said flange.

15. The friction clutch of claim 14, wherein said flange includes a plurality of discrete angularly spaced portions and includes a first side facing said support and a second side facing said gear.

16. The friction clutch of claim 14, wherein said fastener means includes elements which secure said gear to said flange.

17. The friction clutch of claim 14, wherein said support has axially parallel tapped bores and said gear and said flange have holes in register with said bores, and further comprising threaded fasteners extending into said bores and through the registering holes of said flange and said gear to thereby attach said gear to said flange and said flange to said support.

18. The friction clutch of claim 14, wherein said flange includes at least one first portion which is disposed between and is in contact with said gear and said support and at least one second portion which is also disposed between said gear and said support but contacts only said support, said first and second portions being offset relative to each other, as considered in the circumferential direction of said support.

19. The friction clutch of claim 1, wherein said component includes a radially outwardly extending flange adjacent to said support and means for fastening said flange to said support, said flange including at least one first portion which is in contact with and at least one second portion which is spaced apart from said support.

20. The friction clutch of claim 1, further comprising at least one male centering member on said support, said component including a radially outwardly extending flange adjacent to said support and having a female centering member receiving said male centering member.

21. The friction clutch of claim 20, wherein said male centering member is anchored in said support.

22. The friction clutch of claim 1, wherein said clutch disc comprises friction lining means engageable by said pressure plate and said counterpressure plate in response to axial movement of said pressure plate toward said counterpressure plate, said component including an at least substantially cylindrical portion spacedly surrounding said clutch disc and having at least one opening disposed substantially radially outwardly of said lining means.

23. The friction clutch of claim 1, wherein said component includes an annulus of prongs.

24. The friction clutch of claim 23, wherein said component further includes a radially outwardly extending flange adjacent to said support and an annular portion spacedly surrounding said pressure plate, said prongs being integral with said annular portion and said clamping portion being constituted by portions of said prongs.

25. The friction clutch of claim 1, wherein said clamping portion includes a plurality of prongs.

26. The friction clutch of claim 1, wherein said component further comprises a substantially cylindrical portion spacedly surrounding at least one of said plates and a plurality of prongs which are integral with said cylindrical portion and include portions together constituting said clamping portion.

27. The friction clutch of claim 1, wherein said second side of said counterpressure plate has bores and further comprising rivets securing said clamping portion to said counterpressure plate, each of said rivets comprising a tubular member extending into one of said bores.

28. The friction clutch of claim 27, wherein said counterpressure plate has surfaces surrounding said bores and each of said tubular members comprises a radially expanded portion having an outer side in contact with the surface surrounding the respective bore.

29. The friction clutch of claim 28, wherein each of said surfaces has a profiled portion and the exterior of the respective tubular member has a complementary profiled portion to prevent extraction of such tubular member from the respective bore.

30. The friction clutch of claim 29, wherein said radially expanded portions of said tubular members consist of ductile material.

31. The friction clutch of claim 29, wherein said profiled portions have threads.

32. The friction clutch of claim 27, wherein each of said rivets further comprises an insert which is driven into the respective tubular member and maintains the latter in form-locking engagement with said counterpressure plate.

33. The friction clutch of claim 32, wherein said bores are blind bores and each of said inserts comprises a stud having a front end portion adjacent to and tapering toward the bottom of the respective blind bore.

34. The friction clutch of claim 27, wherein each of said tubular members has a head overlying said clamping portion to hold the latter against movement away from the second side of said counterpressure plate.

35. The friction clutch of claim 34, wherein each of said rivets further comprises an insert which is driven into the respective tubular member to maintain the latter in form-locking engagement with said counterpressure plate, at least a portion of each of said heads overlying the respective insert to prevent escape of the latter from the respective tubular member.

36. The friction clutch of claim 1, wherein said torque transmitting means comprises several leaf springs each having a first portion secured to said pressure plate and a second portion secured to said support, and further comprising means for centering said component with reference to said support, said distancing means being adjacent to the second portion of one of said leaf springs.

37. The friction clutch of claim 36, wherein said centering means comprises a pin which is anchored in said support and extends into said component, said torque transmitting means further comprising fastener means securing the second portions of said leaf springs to said support and said pin being immediately adjacent to one of said fastener means.

38. The friction clutch of claim 36, wherein said centering means comprises a pin having a portion extending to the other side of said support, one of said leaf springs at least partially overlapping said portion of said pin.

39. The friction clutch of claim 1, wherein said torque transmitting means comprises leaf springs and rivets connecting said leaf springs to said support, and further comprising means for centering said component with reference to said support, said centering means being provided on said support adjacent to one of said rivets.

40. The friction clutch of claim 1, wherein said torque transmitting means comprises leaf springs and rivets securing said leaf springs to said support, at least one of said rivets comprising means for centering said component on said support.

* * * * *